(12) United States Patent
Murphy

(10) Patent No.: US 7,629,799 B2
(45) Date of Patent: Dec. 8, 2009

(54) NIP WIDTH SENSING SYSTEM AND METHOD FOR ELEVATED TEMPERATURE ENVIRONMENTS

(75) Inventor: David L. Murphy, Titusville, PA (US)

(73) Assignee: Stowe Woodward, L.L.C., Middletown, VA (US)

(*) Notice: Subject to any disclaimer, the term of this patent is extended or adjusted under 35 U.S.C. 154(b) by 1023 days.

(21) Appl. No.: 11/128,866

(22) Filed: May 13, 2005

(65) Prior Publication Data

US 2005/0278135 A1 Dec. 15, 2005

Related U.S. Application Data

(60) Provisional application No. 60/571,167, filed on May 14, 2004.

(51) Int. Cl.
*G01R 27/08* (2006.01)
(52) U.S. Cl. ............... 324/691; 73/862.541; 73/862.55; 702/130
(58) Field of Classification Search ................. 324/691; 73/824, 862.55
See application file for complete search history.

(56) References Cited

U.S. PATENT DOCUMENTS 6,370,961 B1 * 4/2002 Trantzas et al. ............... 73/824

6,568,285 B1 5/2003 Moore et al.

OTHER PUBLICATIONS

PCT WO 00/049379 Nip width sensing system and method (Entire copy attached).*
International Search Report and the Written Opinion of the International Searching Authority for International patent application No. PCT/US2005/016785 mailed on Sep. 1, 2005.

* cited by examiner

*Primary Examiner*—Vincent Q Nguyen
(74) *Attorney, Agent, or Firm*—Myers Bigel Sibley & Sajovec

(57) ABSTRACT

A system for measuring nip width for a nip present between two rolls includes: (a) a sensor assembly; (b) a resistance-measuring unit that measures an electrical resistance; (c) first and second leads, the first lead being connected to a first strip of the sensor assembly adjacent a first end of the first strip, the second lead being connected to a second strip of the sensor assembly; and (d) a controller operatively associated with the resistance-measuring unit, the controller including computer readable program code, the code including a plurality of data sets, each of the data sets representing a relationship between resistance of a sensor and environmental temperature.

12 Claims, 6 Drawing Sheets

NIP WIDTH SENSING SYSTEM AND METHOD FOR ELEVATED TEMPERATURE ENVIRONMENTS

RELATED APPLICATIONS

The present invention claims priority from U.S. Provisional Patent Application Ser. No. 60/571,167, filed May 14, 2004, the disclosure of which is hereby incorporated herein in its entirety.

FIELD OF THE INVENTION

The present invention relates to a system and method for use in connection with nipped rollers and rollers nipped with shoes such as those used in papermaking, and more particularly to such a system and method which are capable of determining the nip width distribution between the nipped rollers.

BACKGROUND OF THE INVENTION

Nipped rolls are used in a vast number of continuous process industries including papermaking, steel making, plastics calendering and printing. The characteristics of nipped rolls are particularly important in papermaking. In the process of papermaking, many stages are required to transform headbox stock into paper. The initial stage is the deposition of the headbox stock onto paper machine forming fabric or wire. Upon deposition, the white water forming a part of the stock flows through the interstices of the forming fabric, leaving a mixture of water and fiber thereon. The forming fabric, and subsequently the felt, then supports the mixture, leading it through several dewatering stages such that only a fibrous web or matt is left thereon.

One of the stages of dewatering takes place in the press section of the papermaking apparatus. In the press section, two or more cooperating rolls press the fibrous web as it travels on the felt between the rolls. The rolls, in exerting a great force on the felt, cause water to be expressed from the web traveling thereon and the web to become flattened, thereby achieving a damp fibrous matt. The damp matt is then led through several other dewatering stages.

The amount of nip pressure applied to the web and the size of the nip can be important in achieving uniform sheet characteristics. Variations in nip pressure can affect sheet moisture content and sheet properties. Excessive pressure can cause crushing or displacement of fibers as well as holes in the resulting paper product.

Roll deflection, commonly due to sag or nip loading, can be a source of uneven pressure and/or nip width distribution. Worn roll covers may also introduce pressure variations. Rolls have been developed which monitor and alter the roll crown to compensate for such deflection. Such rolls usually have a floating shell which surrounds a stationary core. Underneath the floating shell are pressure regulators which detect pressure differentials and provide increased pressure to the floating shell when necessary.

Notwithstanding the problem of roll deflection, the problem of uneven loading across the roll length and in the cross machine direction persists because pressure is often unevenly applied along the roll. For example, if roll loading in a roll is set to 200 pounds per inch, it may actually be 300 pounds per inch at the edges and 100 pounds per inch at the center.

Crown corrections are often made from nip width measurements. For simple crown corrections, the amount of correction may be estimated from:

$$C = (N_E^2 - N_C^2)\frac{D_1 + D_2}{2D_1 D_2}$$

where
 $N_E$ is the nip width at the end of the roll,
 $N_C$ is the nip width at the center of the roll, and
 $D_1$ and $D_2$ are the roll diameters.

This equation is used throughout the paper industry for estimating crown corrections.

One technique for assessing and measuring nip width is discussed in U.S. Pat. No. 6,568,285 to Moore et al., the disclosure of which is hereby incorporated herein in its entirety. This technique involves the use of sensors, typically formed of overlying but non-contacting layers of relatively resistive carbon and highly conductive silver, which are attached to an elongate sheet. The sheet is positioned in the nip. As the sensors extend lengthwise through the nip, the layers of the sensors deform and contact one another, thereby changing the electrical resistivity of the overall sensor. This change in resistivity can be correlated to the contact length of the sensor, which represents the width of the nip. This technique is employed by the NipProfiler® system available from Stowe Woodward LLC, Middletown, Va.

Although this technique has proven to be a reliable manner in which to measure nip width in a variety of locations on a papermaking machine, the device has been unable to provide reliable results in elevated temperature environments (e.g., above 200° F.). As such, it would be desirable to provide an apparatus for sensing nip width that can operate under elevated temperature conditions.

SUMMARY OF THE INVENTION

The present invention can provide a system and method for measuring nip width in elevated temperatures. As a first aspect, embodiments of the present invention are directed to a system for measuring nip width for a nip present between two rolls. The system comprises: (a) a sensor assembly, said sensor assembly including: 1) a first strip formed of a first electrically conductive material having a resistance, the first strip having a first end and a second end and a first measuring zone between the first and second ends; 2) a second strip disposed adjacent the first strip and formed of a second electrically conductive material, the second strip having a second measuring zone disposed adjacent and substantially coextensive with said first measuring zone; 3) a gap defined between the first and second strips and electrically isolating the first and second strips from one another; and 4) wherein at least one of the first and second strips is deformable such that, when the device is placed in the press nip, pressure from the nip rolls forces portions of the first and second measuring zones into electrically conductive contact with one another over a contact length, the contact length corresponding to the nip width. The system further comprises: (b) a resistance-measuring unit that measures an electrical resistance; (c) first and second leads, the first lead being connected to the first strip adjacent the first end, the second lead being connected to the second strip; and (d) a controller operatively associated with the resistance-measuring unit, the controller including computer readable program code, the code including a plurality of data sets, each of the data sets representing a relationship between resistance of a sensor and environmental temperature.

As a second aspect, embodiments of the present invention are directed to a method of determining the width of a nip positioned between two rolls. The method comprises the steps of: (a) selecting a data set representative of a relationship between nip width and resistance for a sensor over a specific temperature range, the data set being selected from a plurality of data sets; (b) positioning the sensor in the nip, the sensor comprising: 1) a first strip formed of a first electrically conductive material having a resistance, the first strip having a first end and a second end and a first measuring zone between the first and second ends; 2) a second strip disposed adjacent the first strip and formed of a second electrically conductive material, the second strip having a second measuring zone disposed adjacent and substantially coextensive with the first measuring zone; 3) a gap defined between the first and second strips and electrically isolating the first and second strips from one another; and 4) wherein at least one of the first and second strips is deformable such that, when the device is placed in the press nip, pressure from the nip rolls forces portions of the first and second measuring zones into electrically conductive contact with one another over a contact length, the contact length corresponding to the nip width; (c) measuring the resistance of the sensor; and (d) converting the measured resistance of the sensor to a calculated nip width employing the data set selected in step (a).

DETAILED DESCRIPTION OF EMBODIMENTS OF THE INVENTION

Figure 1:
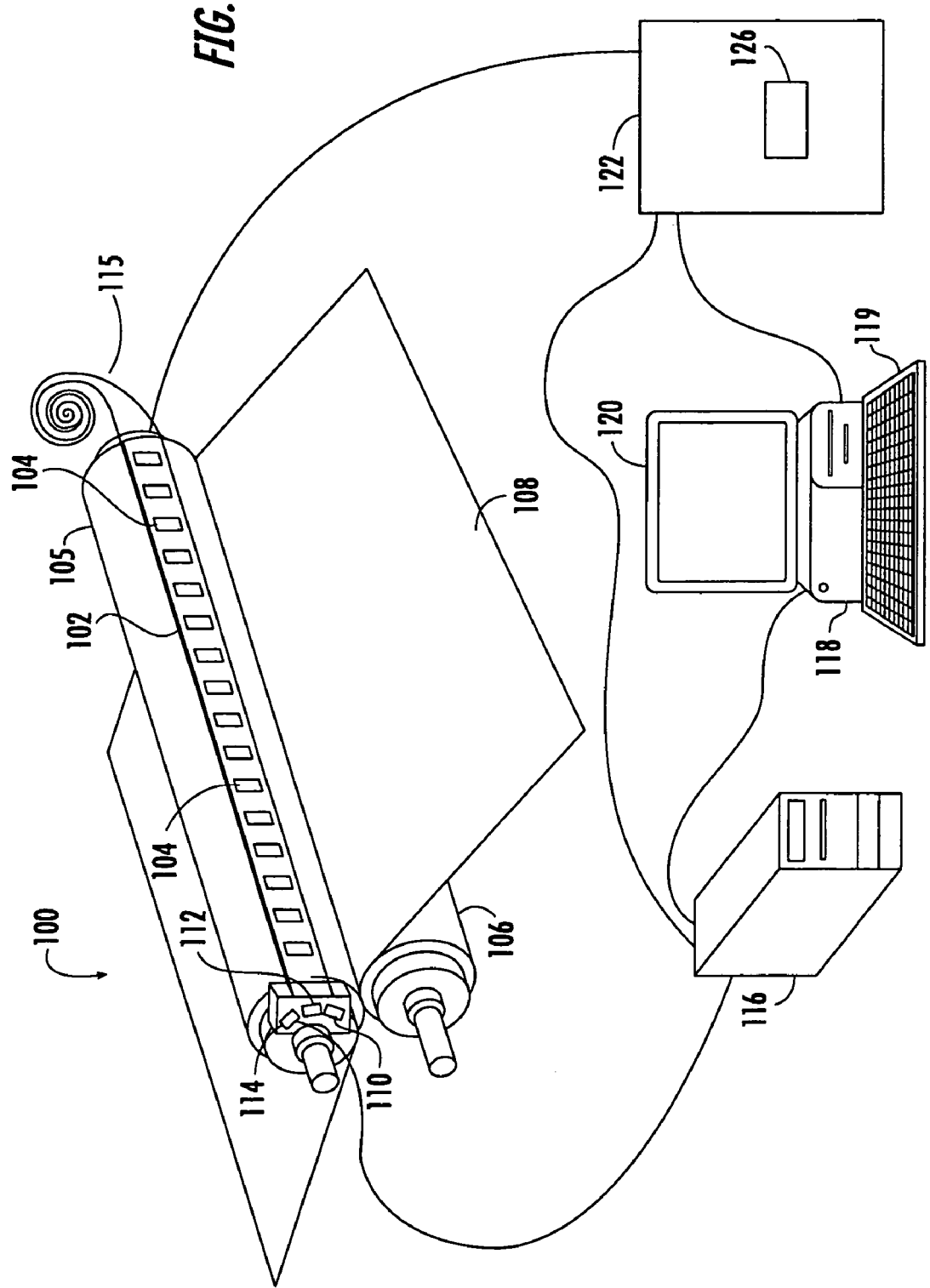
FIG. 1 is a schematic view of a sensing system according to the present invention including a sensing strip, a plurality of sensors according to the present invention being mounted on the sensing strip.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The flowcharts and block diagrams of certain of the figures herein illustrate the architecture, functionality, and operation of possible implementations of systems according to the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved. In certain embodiments, the present invention can provide computer program products for operating a sensing system. The computer program product can include a computer readable storage medium having computer readable program code embodied in the medium.

Well-known functions or constructions may not be described in detail for brevity and/or clarity.

As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
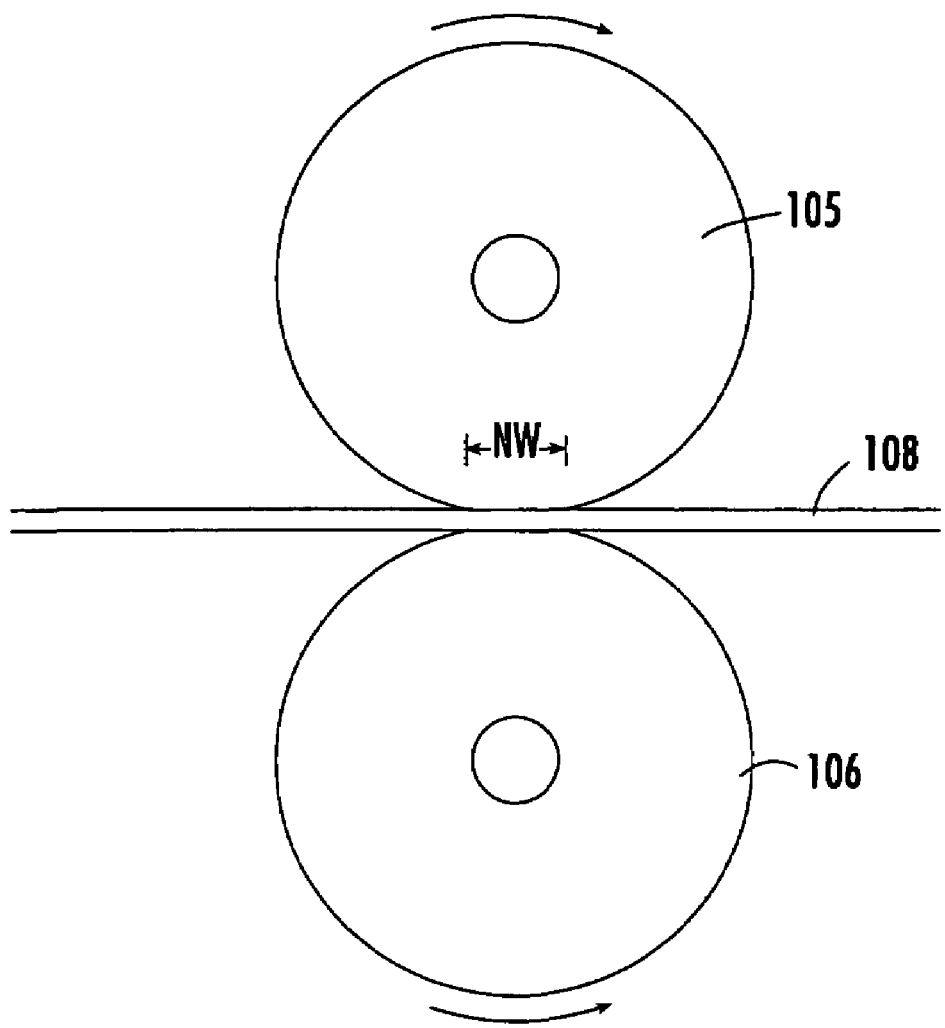
FIG. 2 is an end, schematic view of a press nip and a web nipped between the nip rolls thereof, the nip width of the press nip being designated NW.

Turning now to the figures, a sensing system, designated broadly at 100, is illustrated in FIG. 1. The sensing system 100 can be employed to sense the nip width of rolls 105, 106 in a press nip. As also seen in FIG. 2, in the press nip section of a papermaking machine, the rolls 105 and 106 rotatingly squeeze a fibrous web which may be carried on felt 108 disposed therebetween. In order for the rolls 105, 106 to provide uniform pressure to a fibrous web, they should be evenly loaded and the width of contact between the rolls 105, 106, i.e., the nip width, should be within a predetermined range.

The sensing system 100 comprises a strip 102, preferably an elongated member made of a thin film of material. The strip 102 is formed of an electrically insulative material, and in some embodiments is formed of a polyimide film, such as KAPTON® polyimide film, as this material can withstand temperatures up to about 750° F. A plurality of membrane sensors 104 are fixed to the strip 102 for sensing nip width. The sensors 104 are described in greater detail below.

Figure 3:
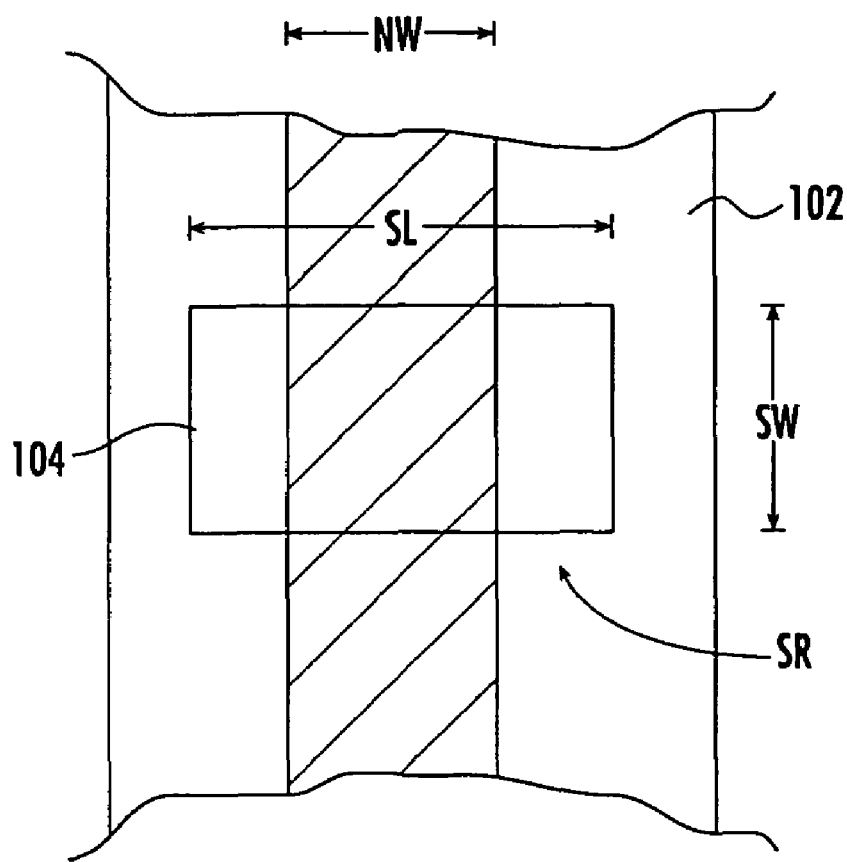
FIG. 3 is a top, schematic, fragmentary view of the sensing strip of FIG. 1 including a sensor mounted on the sensing strip.
Figure 4:
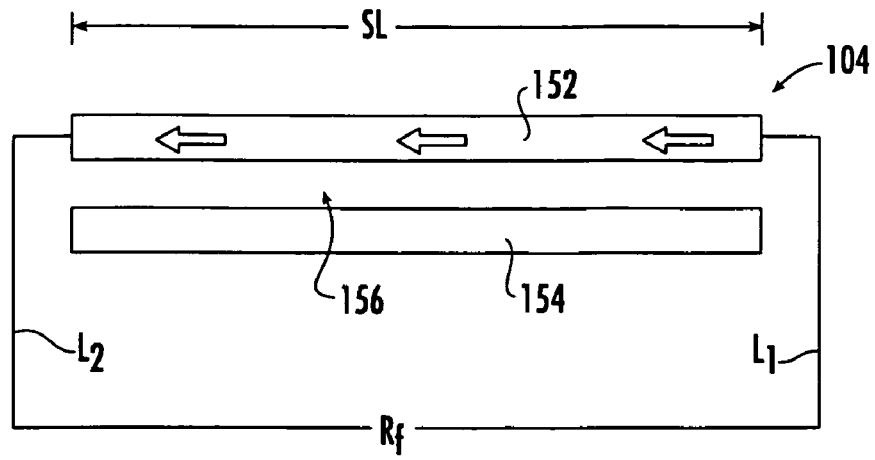
FIG. 4 is a side, schematic view of sensor layers of the sensor shown in FIG. 3 depicted in an unloaded condition.

Referring now to FIGS. 3 and 4, each sensor 104 has an effective sensing length SL that is longer than the nip to be measured and an effective sensing width SW. Each sensor 104 includes a plate or strip 152 and an opposed, coextensive plate or strip 154. Preferably, the strips 152 and 154 are both flexible and resilient. The strips 152, 154 are separated by a gap 156 and are coupled together by electrically insulative edge supports in parallel relationship. The sensor 104 is adapted to be installed in the nip such that the effective sensing length SL extends perpendicular to the axes of the rolls and across the nip width NW of the nip rolls 105, 106.

The upper strip 154 is a conductive layer, typically comprising a precious metal, such as silver or gold, and may be applied in the form of a conductive ink. The lower strip 152 is a resistive layer, typically comprising a resistive material such as carbon. The lower strip 152 may also be applied in the form of an ink. Both materials should be selected to withstand an environment of at least 400° F.

Conventional membrane switches are typically provided with relatively rigid, reinforced edges. While reinforced edges do not present a drawback for conventional applications such as touch pads, if employed in the nip width sensor 104 such reinforced edges may carry an undesirably large proportion of the nip load. As a result, the accuracy of the readings from the sensor may be materially reduced. In place of reinforced edges, the sensor 104 may include soft, compressible, electrically insulative edges coupling the strips 52, 54. The edges may be formed of rubber and should tolerate compressive strains of at least about 50%. A spacer strip may be provided to reduce the compression requirements of the insulative edges.

In addition, other components may be included between the upper and lower strips 152, 154 in order to help maintain separation therebetween prior to placement in the nip. For example, dielectric patterns, such as dots, lines, or the like, may be employed as spacers in order to maintain separation between the strips 152, 154. Exemplary patterns are discussed in U.S. Pat. Nos. 6,370,961 and 6,360,612 to Trantzas, the disclosures of each of which are incorporated herein by reference.

Lead lines $L_1$ and $L_2$ are connected to opposite ends of the strip 152. Consequently, the sensor 104 provides a variable resistance $R_f$ between the lead lines $L_1$ and $L_2$. The lead lines $L_1$, $L_2$ are connected with contacts 160, 162 (FIG. 6) at one end of the sensor 104 for simple connection to lead wires 107. The contacts 160, 162 are covered in this embodiment with a conductive tape and a protective paper layer 164 to protect the contacts 160, 162 from elevated operating temperatures. The lead lines $L_1$, $L_2$ are connected to may be connected to a suitable resistance measuring, conditioning and converting circuit to provide a signal corresponding to the resistance $R_f$.

When the sensor 104 is not under the load of the nip rolls, it will assume the open, non-nipped position of FIG. 4. All current between the leads $L_1$ and $L_2$ will flow through the carbon strip 152, as indicated by directional arrows in FIG. 4. The sensor 104 will then have a resistance value $R_f$ equal to the resistance of the entire length of the carbon strip 152.

Figure 5:
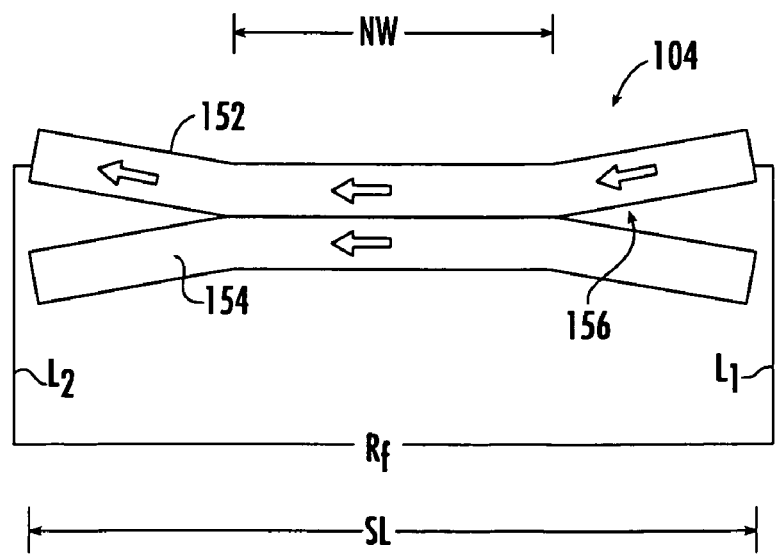
FIG. 5 is a side, schematic view of sensor layers of the sensor shown in FIG. 3 depicted in a loaded condition.

When the sensor 104 is in the nip and loaded across the nip width NW, the adjacent, opposed segments of the strips 152 and 154 within the nip width NW, and thus having lengths equal to the nip width NW, are forced together, as shown in FIG. 5, eliminating a portion of the gap 156 and establishing electrical continuity between the strips 152, 154. Because the silver strip 154 has substantially less resistance per unit length than the carbon strip 152, between the end points of the nip width NW most of the current between leads $L_1$ and $L_2$ flows through the portion of the silver plate in the nip width NW, as indicated by the double arrow. A relatively small amount of current may also flow through the portion of the carbon strip 152 in the nip width NW, as indicated by the single arrow. Thus, the carbon strip 152 is effectively short-circuited or bypassed in the nip width and the resistance value $R_f$ is reduced proportionally to the size of the nip width. The extent of the bypass, and thus the extent of the reduction in the resistance $R_f$, will vary with the length of the nip width NW and the corresponding length of contact between the strips 152, 154. For greater nip widths, the resistance $R_f$ will be lower, and for smaller nip widths, the resistance $R_f$ will be greater.

Those skilled in this art will appreciate that other configurations of leads connecting the sensor strips 152, 154 to processing electronics may be employed. For example, in some embodiments the contacts 160, 162 may be omitted, and the leads L1, L2 may be connected directly to the processor. Also, more than two leads may be employed; for example, three leads, as described in U.S. Pat. No. 6,568,285 to Moore et al. discussed above, may be used.

The resistance $R_f$ may be measured and converted to a corresponding voltage signal in known manner. Typically, an equation or calibration graph correlating the resistance $R_f$ and the nip width NW can be produced. Using the equation or calibration reference, an operator or software may conveniently and accurately determine the sensed nip width (notably, the magnitude of the pressure on the sensor 104 ordinarily will not affect the resistance $R_f$ of the sensor and therefore will not be reflected in the signal).

Figure 7:
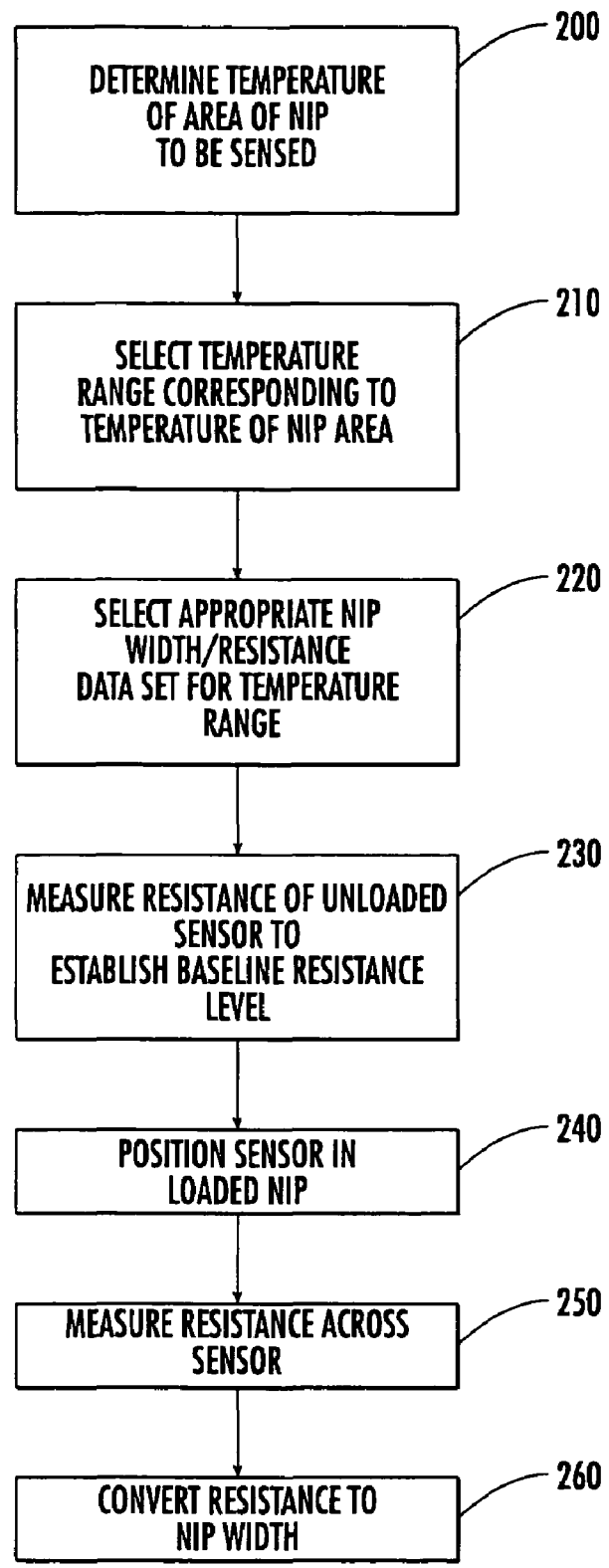
FIG. 7 is a flow chart illustrating operations of a nip width sensing system according to embodiments of the present invention.

It has been determined, however, in conjunction with the present invention that the equations and calibration graphs typically employed with such sensors may not be adequate for use at elevated temperatures. For example, the resistivity of the materials comprising the strips 152, 154 may vary from linearity at increased temperatures, thereby rendering a conventional equation or graph unsuitable. As such, in some embodiments the software employed with the sensors 104 may address this issue. As an example, some software is designed such that, once an unloaded measurement of the resistance of a sensor 104 is made during calibration, application of an equation or graph can relatively accurately predict the nip width based on the change in measured resistance. However, this technique has been found to be unsuitable in some embodiments at elevated temperatures. Referring to FIG. 7, for such embodiments, the software may be designed to enable an operator to determine the temperature of the area of the nip to be sensed and to select a temperature range within which the system 100 is to be operated (Block 200, 210). The software can then select an appropriate nip width/resistance data set for that temperature range (typically in the form of a graph or equation) from a plurality of nip width/resistance data sets that best simulates the relationship of nip width and resistance for the sensor materials at that range (Block 220). Typically, between about 3 and 20 data sets are employed, each usable over a temperature range of between about 10 and 200° F. (typically data sets at higher temperatures are used over smaller temperature ranges). Once that selection is made for each sensor, the operator can then calibrate each sensor by taking an unloaded measurement for the sensor to establish a baseline resistance for the sensor (Block 230). The strip 102 can then be loaded into the nip (Block 240), a loaded measurement of resistance taken (Block 250), and the nip width determined with the selected nip width/resistance relationship based on the resistance measured (Block 260).

The strip 102 having the sensors 104 thereon is shown for discussion purposes in FIG. 1 as not contacting the felt 108 and the roll 106. During system operation, however, the strip 102 must lie in the nip between the roll 105 and the felt 108 or directly between the rolls 105 and 106. Placement of the strip 102 within the nip may be achieved by removably attaching the strip 102 to the roll 105, as shown, and then rotating the roll 105 to properly position the strip. Alternatively, the strip may be placed directly between the rolls 105 and 106 and rolled into the nip by rotating the rolls. One could also open the nip formed by the rolls 105, 106, place the strip between the rolls, and then close the nip.

The strip 102 having the sensors 104 thereon may be rolled into a coil 115 (FIG. 1) for storage and unrolled during use. The strip 102 may be longer than a roll and the sensors 104 are spaced on the strip 102 so that if a large number of sensors 104 are required to effectively determine pressure distribution or nip width distribution, such as in the case of a long roll, the operator can supply a longer length of the strip 102 (and thereby a larger number of the sensors 104). Any extra, unused length of the strip 102 may extend beyond either or both ends of the rolls. Thus, the sensing system 100 can be used on rolls having different lengths, eliminating the need for different length sensing systems for different rolls and/or mills. Also, several strips of sensors may be pieced end-to-end to span the length of a very long roll.

Also, the system 100 may be equipped with temperature and/or pressure measuring sensors (not shown) to aid in temperature/pressure compensation if needed. The temperature sensors may be embodied (not shown) in the sensors 104 or positioned alongside respective sensors 104 between each or periodic groups of the sensors 104. The temperature sensors may provide temperature signals which can be used both to compensate for temperature effects on the sensors 104 and to provide a temperature profile across the nip. Suitable temperature sensors include thermocouples and RTDs.

Figure 6:
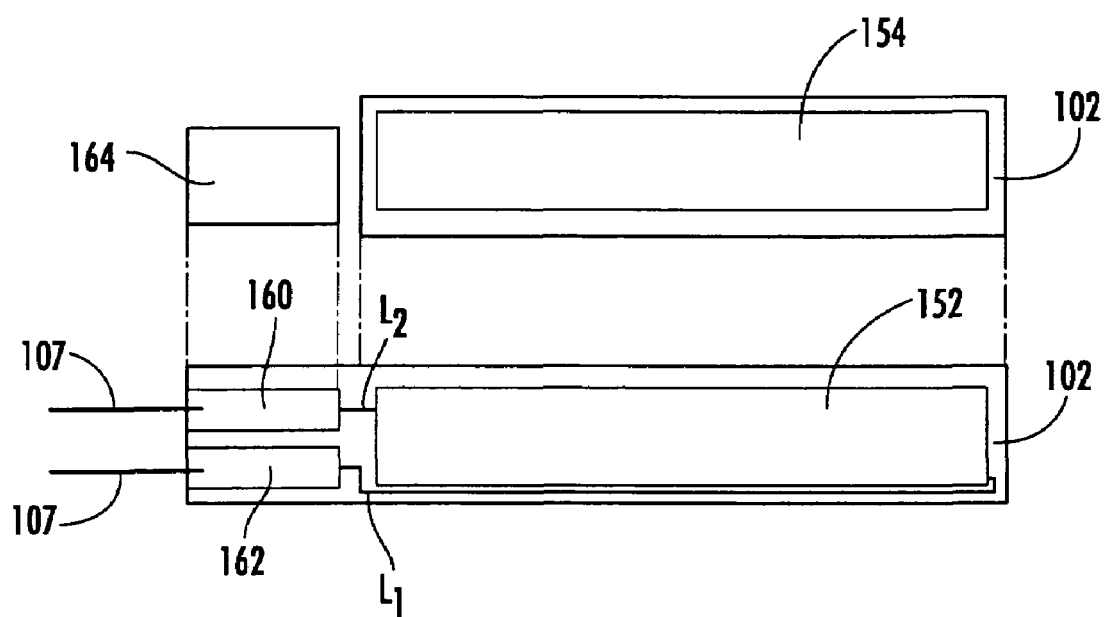
FIG. 6 is an exploded perspective view of the sensor of FIG. 3.

In communication with the sensors 104 are lead wires 107, shown schematically in FIG. 6, which are attached to the contacts 160, 162 and associated electronics 110. As discussed above each sensor 104 will have at least two leads connected to the electronics 110. The two or more leads from each sensor may be converged into a single lead wire or may be mounted individually or in subgroups above and/or below the sensors 104 and routed to the electronics 110.

The electronics 110 are in communication with a multiplexer 112 which is accessed by a bidirectional transmitter 114. The multiplexer 112 cycles through the sensors 104 to obtain signals from sensor locations along the strip 102, and thus along the roll 105, in the press nip. The bidirectional transmitter 114 transmits the signals from the multiplexer 112 to a signal conditioner 116 which, in turn, delivers conditioned signals representing the nip width or pressure sensed to the computer 118. Alternatively (not shown), the relative positions of the electronics 110 and the multiplexer 112 may be reversed.

The sensors and associated electronics are preferably connected directly to the computer via wire cable. A significant benefit of each of the sensors according to the present invention is that they may be used to make nip width measurements in a static nip. Accordingly, it is not necessary to make special provision for the routing of wires connecting the sensors to the electronics and the electronics to the computer. Nonetheless, the signals may be sent via telemetry or through slip rings. A preferred telemetry transmitter is manufactured by RF Monolithics of Dallas, Tex. This telemetry system provides two-way operation which allows the computer to request profile information as well as to receive the sensor readings. An alternative telemetry system is manufactured by Linx Technologies of Medford, Oreg. This system is low power and has a serial interface.

The computer or controller 118 has a microprocessor having the ability to access the multiplexer 112 at predetermined or requested times to obtain nip width-related or pressure-related data. Requested transmissions are achieved by operator input through the keyboard 119 or mouse of the computer. Once the computer 118 has indicated to the multiplexer 112 which channels to read, the computer 181 receives the signals from the sensors 104 associated with the channels or the leads 107 selectively accessed by the multiplexer.

Such signals are delivered to the microprocessor which runs the software program mentioned above to compute or correlate a nip width value or pressure value by one or more methods as described below for each type sensor. Preferably, these values are then transmitted to a display 120 which provides numerical or graphical cross machine nip width profiles and/or pressure profiles. The computer 118 can further provide averages of the pressure or nip width values, as well as initiate a correction signal to an optional control system 122.

The control system 122 can be connected to the computer 118 or the signal conditioner 116 to correct any sensed nip width or pressure irregularities by increasing or decreasing the force being applied by the roll, or by increasing or decreasing the degree of contact between the rolls 105, 106. The control system 122 has an internal computer 126 which, upon receipt of such signals, initiates corrective measures to adjust the force being applied by the rolls 105, 106.

The general operation of the system 100 may be conducted in many ways. One way would be to unload the rolls in contact. The sensor strip 102 is placed between the two rolls, leaving the unused portion in a coiled configuration at the end of the roll 105 or extending beyond each end of the roll 105. The roll 106 is then loaded against the roll 105, which has the strip 102 thereon. After the rolls 105, 106 are loaded to the prescribed journal forces, usually measured by air bag pressures, readings of the sensor strip 102 are acquired, as discussed above.

Another approach to test the nip pressure profile would be to load the rolls at the prescribed journal forces, and then feed the sensor strip 102 through the nip. The placement of the strip 102 may be achieved through a robotic arm or other automated equipment currently available. In addition, the strip 102 could be attached lengthwise to one of the rolls, or could be carried by the felt or web. The sensor readings may be acquired as the sensor passes through the nip. Preferably, however, the sensors are positioned between the rolls to span the nip width and the measurements are made with the press nip in a static condition. Notably, each of the sensor embodiments described hereinafter allow for measurements in a static press nip.

In either method, at a predetermined or operator-requested time, the computer 110 communicates with the bidirectional transmitter 114, which further communicates with the multiplexer 112. The multiplexer 112 then cycles through the sensors 104, obtaining signals through the associated electronics 110, which signals are indicative of the nip width (and, in the case of some sensors, the pressure) being sensed by the sensors 104. The multiplexer 112 then communicates with the transmitter 114 to send the signals to the signal conditioner 116 for delivery back to the computer 118 where the determination of the nip width values (and the pressure values) takes place.

The computer 118 then causes a numeric or graphical output to appear on the display 120, alerting the operator of the nip width or pressure distribution in the press. Optionally, the computer 118 and/or the transmitter 114 can communicate pressure-related or nip width-related signals to the control system 122. In response to such signals, the control system 122 can then initiate crown correction to remedy any irregularities in the nip width or pressure sensed.

The system of the instant invention provides the operator with the ability to determine the nip width and pressure profile of a roll in one or more nips so as to diagnose the presence of unevenly applied roll forces. The various graphical representations enable the operator to immediately determine the nip width, the pressure being applied, the location on the strip (indicative of the location along the length of the roll), and whether or not the nip width and pressure are abnormal. Additionally, the system of the instant invention provides for corrective measures to be initiated in response to such inappropriate nip widths and unevenly applied forces. All of the foregoing can be accomplished in a high temperature environment.

The foregoing is illustrative of the present invention, and is not to be construed as limiting thereof. Although exemplary embodiments of this invention have been described, those skilled in the art will readily appreciate that many modifications are possible in the exemplary embodiments without materially departing from the novel teachings and advantages of this invention. As such, all such modifications are intended to be included within the scope of this invention. The scope of the invention is to be defined by the following claims.

That which is claimed is:

1. A system for measuring nip width for a nip present between two rolls, comprising:
　a) a sensor assembly, said sensor assembly including:
　　1) a first strip formed of a first electrically conductive material having a resistance, said first strip having a first end and a second end and a first measuring zone between said first and second ends;
　　2) a second strip disposed adjacent said first strip and formed of a second electrically conductive material, said second strip having a second measuring zone disposed adjacent and substantially coextensive with said first measuring zone;
　　3) a gap defined between said first and second strips and electrically isolating said first and second strips from one another; and
　　4) wherein at least one of said first and second strips is deformable such that, when said device is placed in the press nip, pressure from the nip rolls forces portions of said first and second measuring zones into electrically conductive contact with one another over a contact length, the contact length corresponding to the nip width;
　b) a resistance-measuring unit that measures an electrical resistance;
　c) first and second leads, the first lead being connected to the first strip adjacent the first end, the second lead being connected to the second strip; and
　d) a controller operatively associated with the resistance-measuring unit, the controller including computer readable program code, the code including a plurality of data sets, each of the data sets representing a relationship between resistance of a sensor and environmental temperature.

2. The system defined in claim 1, further comprising a third strip upon which the first and second strips are mounted.

3. The system defined in claim 2, wherein the third strip comprises polyimide.

4. The system defined in claim 1, wherein the first strip comprises carbon, and the second strip comprises a precious metal.

5. The system defined in claim 1, wherein the computer readable program code includes between about 3 and 20 data sets.

6. The system defined in claim 1, wherein the computer readable program code comprises data sets that represent a temperature range of between about 10 and 200° F.

7. A method of determining the width of a nip positioned between two rolls, comprising the steps of:
　(a) selecting a data set representative of a relationship between nip width and resistance for a sensor over a specific temperature range, the data set being selected from a plurality of data sets;
　(b) positioning the sensor is the nip, the sensor comprising:
　　1) a first strip formed of a first electrically conductive material having a resistance, said first strip having a first end and a second end and a first measuring zone between said first and second ends;
　　2) a second strip disposed adjacent said first strip and formed of a second electrically conductive material, said second strip having a second measuring zone disposed adjacent and substantially coextensive with said first measuring zone;
　　3) a gap defined between said first and second strips and electrically isolating said first and second strips from one another; and
　　4) wherein at least one of said first and second strips is deformable such that, when said device is placed in the press nip, pressure from the nip rolls forces portions of said first and second measuring zones into electrically conductive contact with one another over a contact length, the contact length corresponding to the nip width;
　(c) measuring the resistance of the sensor; and
　(d) converting the measured resistance of the sensor to a calculated nip width employing the data set selected in step (a).

8. The method defined in claim 7, wherein the data set is selected from between about 3 and 20 data sets.

9. The method defined in claim 7, wherein each of the plurality of data sets represents a temperature range of between about 10 and 200° F.

10. The method defined in claim 7, wherein the first strip comprises carbon, and the second strip comprises a precious metal.

11. The method defined in claim 7, wherein the first and second strips are mounted on a third strip.

12. The method defined in claim 7, wherein the third strip comprises polyimide.

* * * * *

UNITED STATES PATENT AND TRADEMARK OFFICE
CERTIFICATE OF CORRECTION

PATENT NO. : 7,629,799 B2  
APPLICATION NO. : 11/128866  
DATED : December 8, 2009  
INVENTOR(S) : Murphy Page 1 of 1

It is certified that error appears in the above-identified patent and that said Letters Patent is hereby corrected as shown below:

In the Claims:

Column 10, Claim 1, Line 3: Please correct "connected to the second strip; and"
to read -- connected to the first strip adjacent the second end; and --

Signed and Sealed this

Twenty-second Day of June, 2010

David J. Kappos
*Director of the United States Patent and Trademark Office*